United States Patent
Hofele et al.

(10) Patent No.: US 6,374,994 B1
(45) Date of Patent: *Apr. 23, 2002

(54) MODULAR TRANSFER SYSTEMS HAVING SWIVEL DRIVES AND LINEAR DRIVES

(75) Inventors: Hans Hofele, Göppingen; Andreas Dangelmayr, Ottenbach; Jürgen Eltze, Göppingen; Karl Thudium, Wäschenbeuren, all of (DE)

(73) Assignee: Schuler Pressen GmbH & Co., Goeppingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,253

(22) Filed: Nov. 10, 1999

(30) Foreign Application Priority Data

Nov. 10, 1998 (DE) .......................... 198 51 746

(51) Int. Cl.$^7$ .............................. B65G 25/04
(52) U.S. Cl. .............. 198/750.1; 198/468.01; 198/750.11; 198/750.12
(58) Field of Search .............. 198/750.1, 750.11, 198/750.12, 468.2, 468.4, 689.1, 468.6, 750.14; 414/225.01, 752.01, 749.1

(56) References Cited

U.S. PATENT DOCUMENTS

| | | | | |
|---|---|---|---|---|
| 3,991,885 A | * | 11/1976 | Warren | 214/1 BV |
| 4,490,091 A | * | 12/1984 | Brems | 414/749 |
| 4,496,280 A | * | 1/1985 | Brems | 414/749 |
| 4,806,070 A | * | 2/1989 | Poux et al. | 414/752 |
| 4,807,456 A | * | 2/1989 | Shiraishi et al. | 72/405 |
| 5,174,709 A | * | 12/1992 | Blatt et al. | 414/567 |
| 5,215,181 A | * | 6/1993 | Blatt | 198/468.2 |
| 5,337,594 A | * | 8/1994 | Pettersson et al. | 72/446 |
| 5,359,875 A | * | 11/1994 | Sova | 72/336 |
| 5,363,683 A | * | 11/1994 | Thudium et al. | 72/405 |
| 5,598,733 A | * | 2/1997 | Sova | 72/336 |
| 5,829,300 A | * | 11/1998 | Sova | 72/336 |
| 5,842,370 A |   | 12/1998 | Hofele | |
| 5,967,291 A | * | 10/1999 | Hansen | 198/409 |
| 5,992,207 A | * | 11/1999 | Hofele et al. | 72/405.01 |
| 5,993,143 A | * | 11/1999 | Eltze et al. | 414/752 |

FOREIGN PATENT DOCUMENTS

| | | |
|---|---|---|
| DE | 41 43 099 | 7/1993 |
| WO | WO 93/00185 | 1/1993 |

* cited by examiner

Primary Examiner—Christopher P. Ellis
Assistant Examiner—Rashmi Sharma
(74) Attorney, Agent, or Firm—Crowell & Moring LLP

(57) ABSTRACT

A transfer system, particularly for the transfer of workpieces in multi-station presses (1), consists of several transfer modules (14 to 19), which each have a workpiece holding device (28) which is carried by at least one lever mechanism (23). Each lever mechanism transmits the adjusting movement of two mutually independent drives (39, 44) to the workpiece holding device (28). One of the drives (39, 44) is disposed in a stationary manner, and the other is moved by the drive disposed in a stationary manner. This basic principle opens up many design possibilities.

18 Claims, 6 Drawing Sheets

MODULAR TRANSFER SYSTEMS HAVING SWIVEL DRIVES AND LINEAR DRIVES

This application claims priority of DE 198 51 746.7, filed Nov. 10, 1998, the disclosure of which is expressly incorporated by reference herein.

The invention relates to a transfer system having the characteristics of the preamble of claim 1.

Transfer systems are required, for example, in the case of vehicle body presses. Vehicle body parts are manufactured from metal sheets in several successive forming steps. For this purpose, the vehicle body presses have several press stations which operate at the same stroke rate. When the tools of the individual press stations open up, the workpieces must be transferred in order to be fed to the respective next machining stage. Transfer systems are used for this purpose.

Such a transfer system is known from German Patent Document DE 41 43 099 A1. This transfer systems has so-called suction bridges which are formed by a cross member with vacuum-operated suction devices provided thereon. These suction devices are set up for receiving the sheet metal parts and releasing them again in a controlled manner. The suction bridges are held on both ends on the travelling carriages which are movably disposed on guide rails. The guide rails extend in parallel and at a distance from one another through the whole length of a transfer press. For the workpiece transport, the suction bridges move into opened tools, receive a workpiece and move these to an intermediate deposit or receive the workpieces in the intermediate deposit and move into the opened next tool. For driving the travelling carriages, a linkage is provided which leads to a cam drive. This cam drive is connected with the main press drive. A lifting and lowering movement is superimposed to the back-and-forth movement of the transfer rails achieved in this manner. This lifting and lowering movement is generated in that the guide rails as a whole are lifted and lowered. The stroke units are used for this purpose.

Such a transfer system moves the suction bridges connected with a cam drive in a synchronous manner. Correspondingly, the participating tools must simultaneously open and close.

A more flexible transfer system is desirable in many cases.

A modular transfer system is known from International Patent Document WO 93/0185. Between individual press stations, transfer modules are arranged which can be controlled independently of one another. Each transfer module includes a suction bridge whose carrier element extends transversely to the transport direction in a horizontal manner. On its two ends, the carrier element is carried by drive units. The drive units are constructed symmetrically to one another. Each drive unit contains a stroke unit which is disposed in a stationary manner and generates a linear lifting and lowering movement. This lifting and lowering movement is transmitted directly to the carrier element. A crank mechanism is arranged between the stroke unit and the carrier element and has the purpose of causing a movement of the suction bridge in the transport direction. The crank mechanism is formed by a double crank in conjunction with a planetary transmission. The cranks of the crank mechanism and the gear wheels of the planetary transmission can be rotated or swivelled about mutually parallel vertical axes. This results in considerable tilting stress for the individual bearings and articulations of the crank mechanism which may result in problems concerning wear and precision. In addition, during their swivel movement about vertical axes of rotation, the cranks swivel out to the side. A corresponding space has to be kept open for this purpose, which represents a certain limitation.

Based on the above, it is an object of the invention to provide a transfer system which utilizes space existing in a transfer press and has a construction which is as space-saving as possible.

This object is achieved by means of a transfer system having the characteristics of claim 1.

The transfer system according to the invention has a modular construction and contains several mutually independently controllable transfer modules. Each transfer module is arranged between two stations of the transfer press or other system. The stations may be press stages or other machining or orienting stations.

As the result of the independent controllability of the transfer modules, it is possible to cause press stations to operate in a time-staggered manner.

The workpiece holding devices, which are formed, for example, by suction bridges, are guided by a swivel arm which is disposed to be swivellable about a swivelling axis. The arrangement of the swivelling axis according to the invention —deviating from the vertical line and preferably horizontal —permits a compact construction of the press.

The drive of the swivel arm contains a combination of a linear drive and a rotary or swivel drive. It is endeavored to construct a multi-station press to be as short as possible. For this reason, it is attempted to set up the individual press stations or the corresponding tables at a distance from one another that is as small as possible. The smallest possible distance is defined by the space requirement of the press stands if sliding tables between the press stands are to be moved laterally to the outside. For this reasons, the press stands are not very wide. The space for the transfer modules arranged here is correspondingly small. By means of the combination of the linear drive and the swivel drive, it becomes possible to utilize this space well. For example, only a single linear drive, which is relatively narrow, has to be arranged on a press stand. The swivel drive may be arranged on a linear slide block moved by the linear drive, whereby no additional space requirement is created in the transport direction.

The arrangement of the swivelling axis of the swivel arm according to the invention has the result that the swivel arm can take up a vertical position in which it is virtually in parallel to the press stands and also in parallel to the working direction of the press slides. In this position, the space requirement is minimal. When the tools open and a transfer stroke is to be carried out, the swivel arm will swivel out to the tool which is disposed in front or behind it in the transport direction. However, in this case, the swivel arm does not carry out a laterally projecting movement or other movement which may lead to a collision with the tool or with parts of the press. In the parking position (vertical swivel arm) as well as in the maximally projecting position (swivel arm is diagonally inclined) as well as in all intermediate positions, the space requirement of the transfer module will remain modest.

The essentially horizontal arrangement of the swivelling axis and of the axis of rotation of the output shaft of the swivel drive have the result that the loads occurring on the swivel arm occur at the corresponding bearing points as a radial load and not as tilting stress. This results in a precise guidance of the workpiece holding device by the swivel arm or arms and to moderate bearing reaction forces. This, in turn, permits a relatively light bearing design and correspondingly high dynamics of the transfer module while the positioning precision is good and the wear is low because of little stress to the material.

The transfer module is preferably constructed with two axes and thus defines a transfer curve which extends in a flat plane. This may, for example, be an imaginary vertical plane extending in the transport direction. The transfer curve K contains only movement components in the transfer direction and, in addition, in the vertical direction. In this case, the swivelling axes of the swivel arms may be oriented transversely to the transport direction. If a lateral offset of the workpieces is desired during the passage through successive press stations, the swivelling axes of the swivel arms may also be arranged at an angle which differs from 90° transversely to the transport direction. The angular position can be adjusted as required.

In addition, the swivelling axis is oriented preferably at a right angle with respect to the movement direction of the linear drive, which preferably operates in the vertical direction. Thus, the dynamic stressing of the linear guide, which occurs predominantly as the result of the acceleration and braking of the workpieces, is absorbed by the lateral guidance of the slide block provided on the linear guide and acts little or not at all upon the stroke drive. Simultaneously, the dynamic bearing reactions on the swivelling axes are oriented in the radial direction. On the whole, a precise as well as statically and dynamically favorable construction is therefore achieved. Different implementation possibilities are obtained. The linear drive may, for example, be disposed in a stationary manner, while the swivel drive is arranged, for example, on a slide block driven by the linear drive. The swivel drive may drive the swivel arm directly. For a movement of the workpiece holding device in the transport direction without a lifting and lowering component, the controlling of both drives will then be required. As an alternative, it is possible to swivellably dispose the swivel arm on a second slide block which is not driven and which can be displaced in parallel to the former slide block or in an alignment therewith. The swivel drive operates the swivel arm, for example, by way of a guide rod. If the guide rod is half as long as the swivel arm and is applied to its center, an uncoupling of the movement is obtained. The swivel drive will then cause only an advance in the transport direction, while the stroke unit causes only the lifting and lowering of the workpiece holding device.

Additional alternative constructions are conceivable. The swivel drive can, for example, be disposed in a stationary manner and the swivel arm may have a telescoping construction. The linear drive will then form the telescope drive. As required, a weight compensation device can be provided on the transfer module which keeps one, several or all drives free of weights. The weight compensation device may, for example, by formed by a force generator (pneumatic cylinder), which, at a suitable point, introduces a force into the transmission carrying the workpiece holding device, which transmission is constructed, for example, as a lever mechanism.

Details of advantageous embodiments of the invention are the object of subclaims, are indicated in the drawing and/or the pertaining description.

Embodiments of the invention are illustrated in the drawing.

FIG. 1 is a schematic cutout-type perspective view of a press working line with a modular transfer system and several successive press stations;

FIG. 2 is a schematic perspective view of two press stations with a transfer module arranged in-between;

FIG. 3 is a basic diagram of the kinematics of the transfer module according to FIG. 2;

FIG. 4 is a view of the modified kinematics of a transfer module;

FIGS. 5 to 7 are views of additional embodiments of transfer modules illustrated by means of their respective kinematics.

Figure 2:
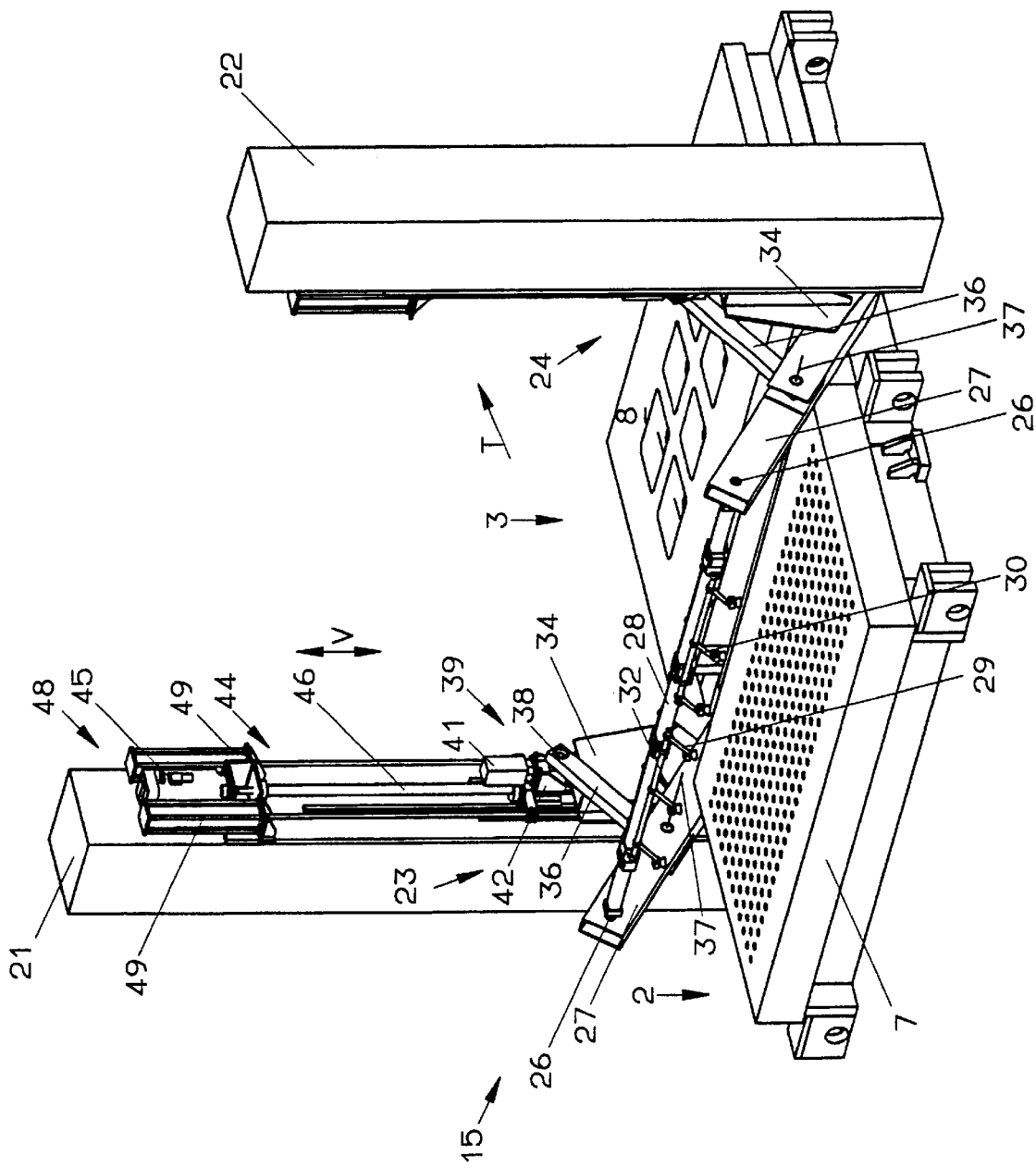

The transfer modules 14 to 19 have identical constructions. Representative of all other transfer modules 14, 16, 17, 18, 19, transfer module 15 will be described in greater detail in the following by means of FIG. 2:

The transfer module 15 is arranged on two press stands 21, 22 which are set up between the press stations 2, 3. However, as required, the transfer module may also be fastened or disposed in a different manner. The transfer module 15 includes two lever mechanisms 23, 24, which are assigned to the press stands 21, 22.

The lever mechanisms 23, 24 and their corresponding drives are constructed symmetrically with respect to a vertical plane imagined along the transport direction T. The subsequent description of the lever mechanism 23 therefore applies in a corresponding manner to the lever mechanism 24. The two lever mechanisms 23, 24 each have an output 26 which is formed by a corresponding receiving device at one end of a swivel arm 27. One end respectively of a suction bridge 28, which extends transversely to the transport direction T, is optionally swivellably disposed in the receiving device. The suction bridge 28 is used as a workpiece holding device and is formed essentially by a special section tube which carries one or several suction spiders 29, 30. These suction spiders 29, 30 each have several suction cups projecting on short arms away from the suction bridge 28.

Figure 1:
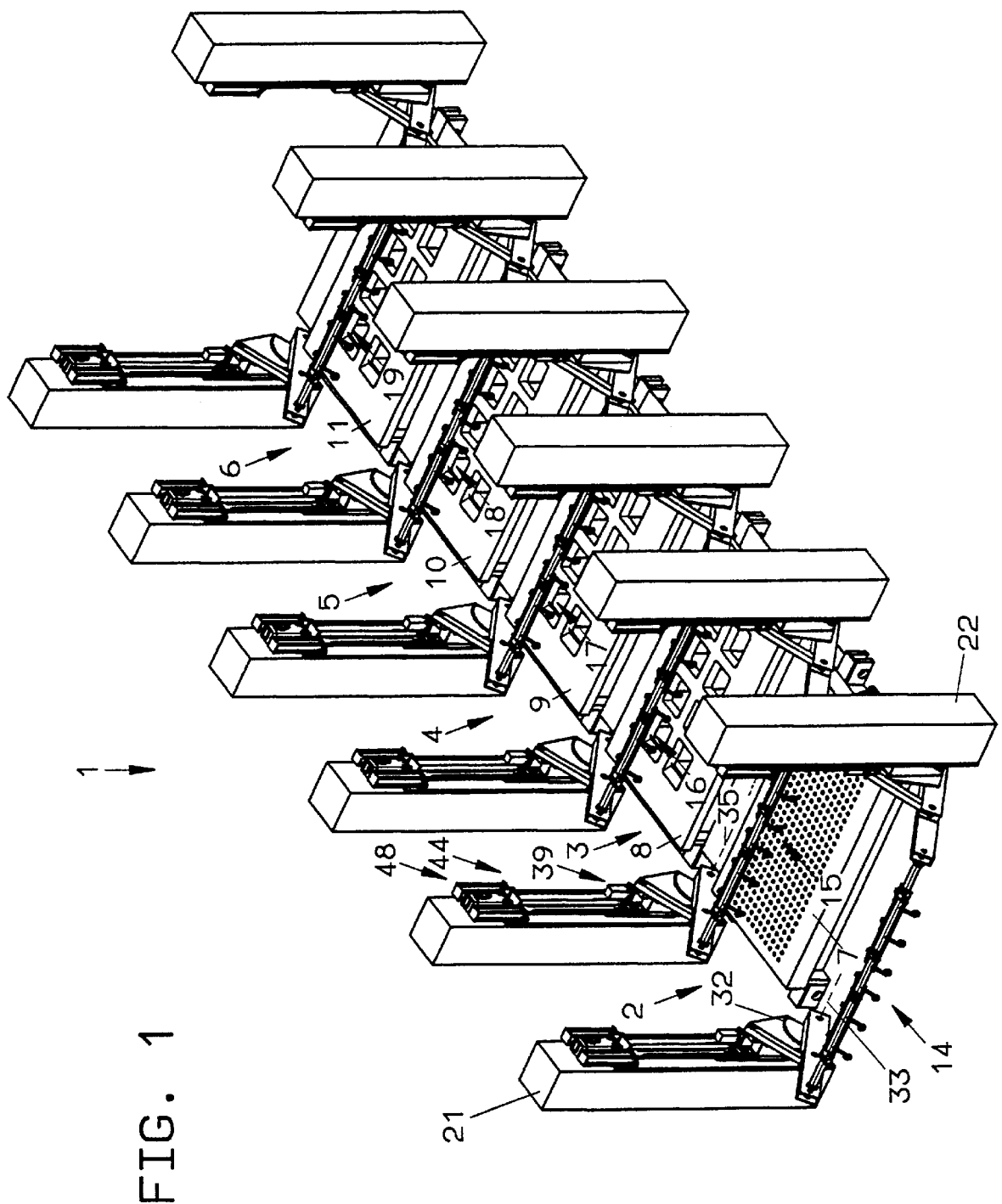
FIG. 1 is a view of a transfer press with several successive press stations 2, 3, 4, 5, 6. The press stations 2 to 6 include press sliding tables 7, 8, 9, 10, 11, on which tools are arranged which are not shown in detail. In order to permit the parts transport into the press stations 2 to 6 and out of these as well as the transfer of workpieces from one press station to another, transfer modules 14, 15, 16, 17, 18, 19 are in each case arranged in front of and behind each press station 2 to 6. These transfer modules are set up for receiving workpieces, such as body parts of motor vehicles, for transporting them forward and for depositing them. In this case, the transfer modules 14 to 19 can be controlled independently of one another, so that they must not necessarily operate synchronously. This opens up the possibility of maximizing the stroke rate of the press and of optimizing the transfer movement for each press station. In addition, individual press stations 2 to 6 can operate in a staggered manner.

At its end away from the receiving device 26, the swivel arm 27 of the lever mechanism 23 is swivellably disposed in a curved guide 32 which, as illustrated particularly in FIG. 1, defines a horizontal swivelling axis 33 oriented transversely to the transport direction T.

The curved guide 32 is disposed on a guiding slide block 34 which is vertically displaceably disposed by a linear guide held on the press stand 21, 22. In this case, the guiding slide block 34 can be freely displaced in the vertical direction V. As a result, the swivelling axis 33 can be adjusted in its radial direction, that is, is can be vertically adjusted.

In addition to including the swivel arm 27, the lever mechanism 23 also includes a guide rod 36 which is swivellably disposed at one end on the swivel arm 27 on an articulation defining a swivelling axis 37. In this case, the swivelling axis 37 is oriented in parallel to the swivelling axis 33. By means of its end away from the swivel arm 27, the guide rod 36 is connected with an output shaft 38 of a swivel drive unit 39. This swivel drive unit 39 defines the swivelling position of the guide rod 36. The swivel drive unit 39 includes a servo motor 41 which acts by way of a step-down and angular gear on the output shaft 38.

The swivel drive unit 39 is disposed on a linear slide block 42 which can be adjusted in the vertical direction V. The displacement direction of the linear slide block 42 coincides with that of the linear slide block 34. The linear slide block 42 is connected with a linear drive unit 44 which includes a servo motor 45. This servo motor 45 is connected by way of a spindle stroke mechanism 46 with the linear slide block 42 in order to adjust its vertical position. The spindle stroke mechanism 46 converts the rotating movement of the servo motor 45 into a stroke movement.

For compensating and relieving the drive units, that is, the swivel drive unit 39 and the linear drive unit 44 with respect to the weight of the lever mechanism 23, of the suction bridge 28 and of possible workpieces, a weight compensating device 48 is arranged on the press stand 21 and includes one or two pneumatic cylinders 49. These act upon the linear slide block 42 by means of an upward-directed force.

Figure 3:
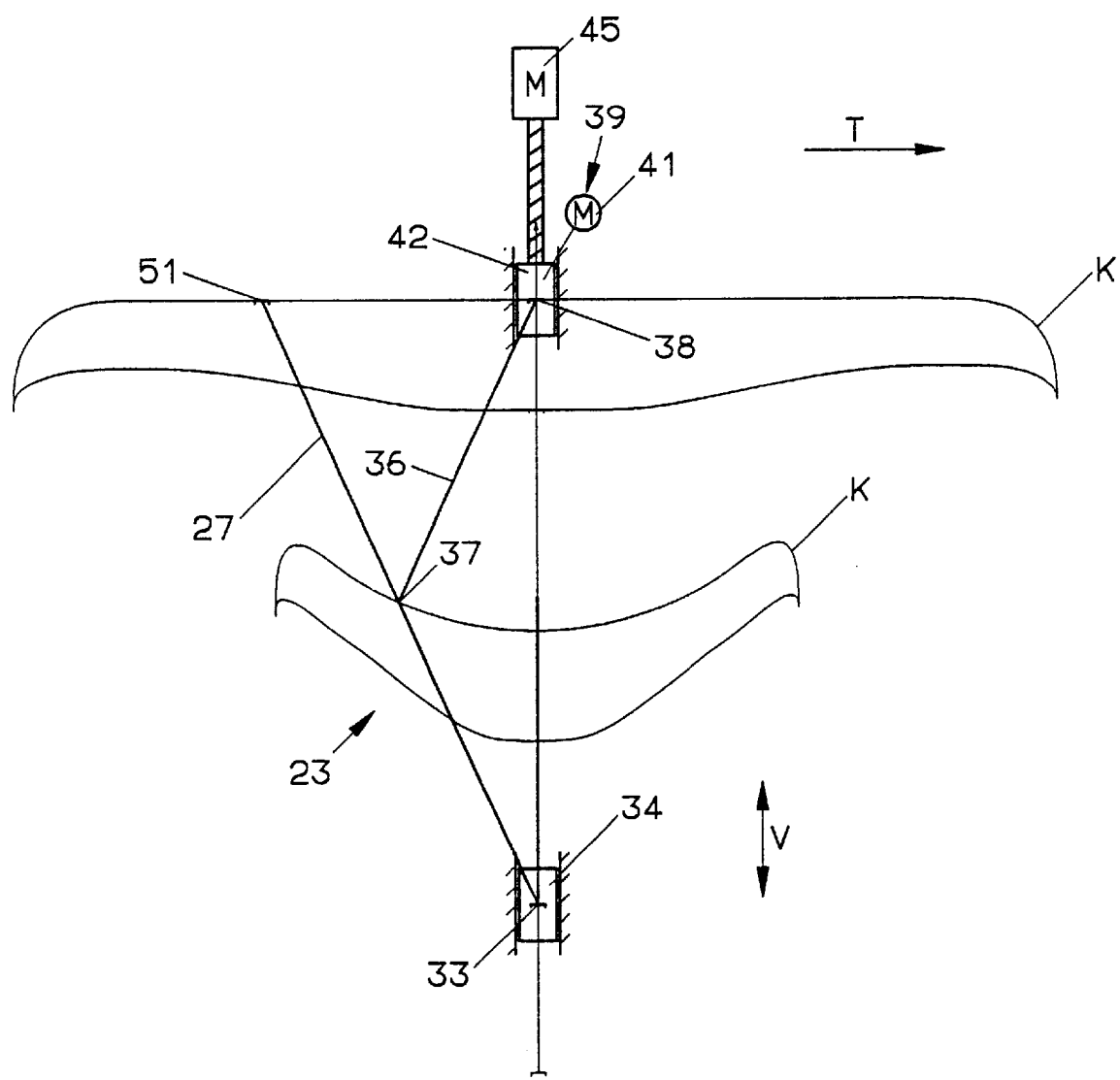

The kinematics of the lever mechanism 23 are illustrated particularly in FIG. 3. The length of the swivel arm 27 disposed on the linear slide block 34 —measured between the swivelling axis 33 and a center axis 51 of the suction bridge 38 —, about which this suction bridge 28 may optionally be swivellable, is twice as large as the length of the guide rod 36. Its length is defined by the distance of the articulation axis 37 from the axis of rotation of the output shaft 38. In this case, the articulation axis 37 is arranged precisely in the center of the swivel arm 27.

The transfer unit 15 described so far operates as follows:

It is assumed that the suction bridge 28 outlined in FIG. 3 by its swivelling axis 51 and the swivel arm 27 are situated in the illustrated position. For travelling along a transfer curve K, the suction bridge 28 must now be guided without vertical adjustment in the transfer direction T. For this purpose, the swivel drive unit 39 is controlled such that the guide rod 36 in FIG. 3 moves counterclockwise. Without a triggering of the linear drive unit 44, the suction bridge 28 travels along a straight path, the linear slide block 34 carrying out a compensation movement in the vertical direction V. For depositing a workpiece in the tool of a subsequent press station, the transfer curve K is downwardly curved. While the swivel drive unit 39 is braked, this path curve is travelled in that the linear drive unit 44 is controlled simultaneously in order to move the linear slide block 42 downward. The movement in the transfer direction T is therefore controlled only by the swivel drive unit 39, and the movement in the vertical direction V is controlled only by the linear drive unit 44. Correspondingly, the other sections of the transfer curve K are travelled by an appropriate controlling of the servo motors 41, 45. This is carried out by a preferably computer-operated control unit which is not shown in detail.

The stroke movement of the linear drive unit 44 is transmitted 1:1 to the suction bridge 28. However, the movement in the transfer direction T is stepped up, which means that the output moves faster than all other points of the lever mechanism. This takes place by the direct transmission of the swivelling movement from the guide rod 36 to the swivel arm 27 without the aid of intermediate gears, gear wheels or the like, and by the relatively large distance between the articulation axis 37 and the swivelling axis 33 with high precision. In order to achieve a fast transport movement of the suction bridge 28, the swivel arm 36 must be swivelled only relatively slowly. As a result, the lifting and lowering speeds of the slide block 42, which occur at the swivel drive unit 39, as well as the adjusting movement generated by the swivel drive unit 39 are relatively slow. Existing masses generate only low inertia forces. The individual elements can therefore have a stable design without any concessions to light construction measures. The movement of the swivel drive unit 39 with the linear slide block 42 does not impair the achievable accelerating and braking values.

The weight of the workpieces and of the elements of the lever mechanism is applied to all bearing points transversely to the axes, such as the articulation axis 37 and the swivel axis 33. However, the articulations and bearings are free of bending stresses. As the result, while their stability is good, the bearings and articulations can be designed to be narrow and space-saving. In addition, the combination of the linear drive and the swivel drive results in a space-saving drive which has a design which is favorable with respect to the drive dynamics.

Figure 4:
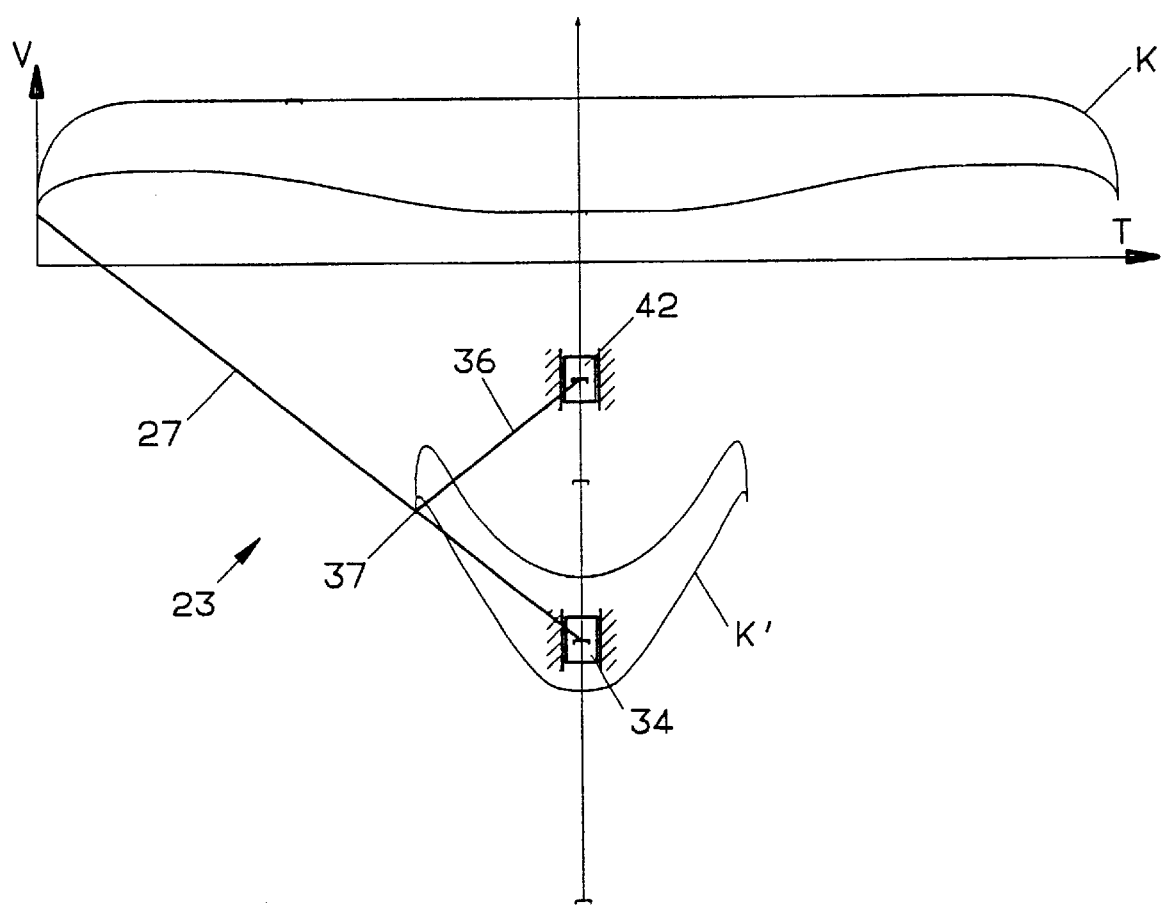

While, in the case of the transfer module 15 with the kinematics according to FIG. 3, a complete uncoupling was achieved between the transfer movement, which is assigned only to the swivel drive unit 39, and the stroke movement, which is assigned only to the linear drive unit 44, FIG. 4 shows a drive device with deviating kinematics. These kinematics first differ essentially as the result of the length ratios of the swivel arm 27 and of the guide bar 36 from those according to FIG. 3. As the result of the asymmetrical division of the swivel arm 27, as illustrated by the comparison of the transfer curve K with the curve K' travelled by the swivelling axis 37, a comparatively greater step-up is achieved. This may be advantageous. In addition, the drive, as a whole, is more compact or, while the size is the same of the guide rod 36 and assigned drives, longer transfer curves K can be achieved. In addition, the swivel drive unit 39 can be arranged at different points of the lever mechanism 23. As required, it may be arranged, for example, at the connection point between the guide rod 36 and the swivel arm 37. An arrangement at the linear slide block 34 is conceivable as an alternative.

Figure 5:
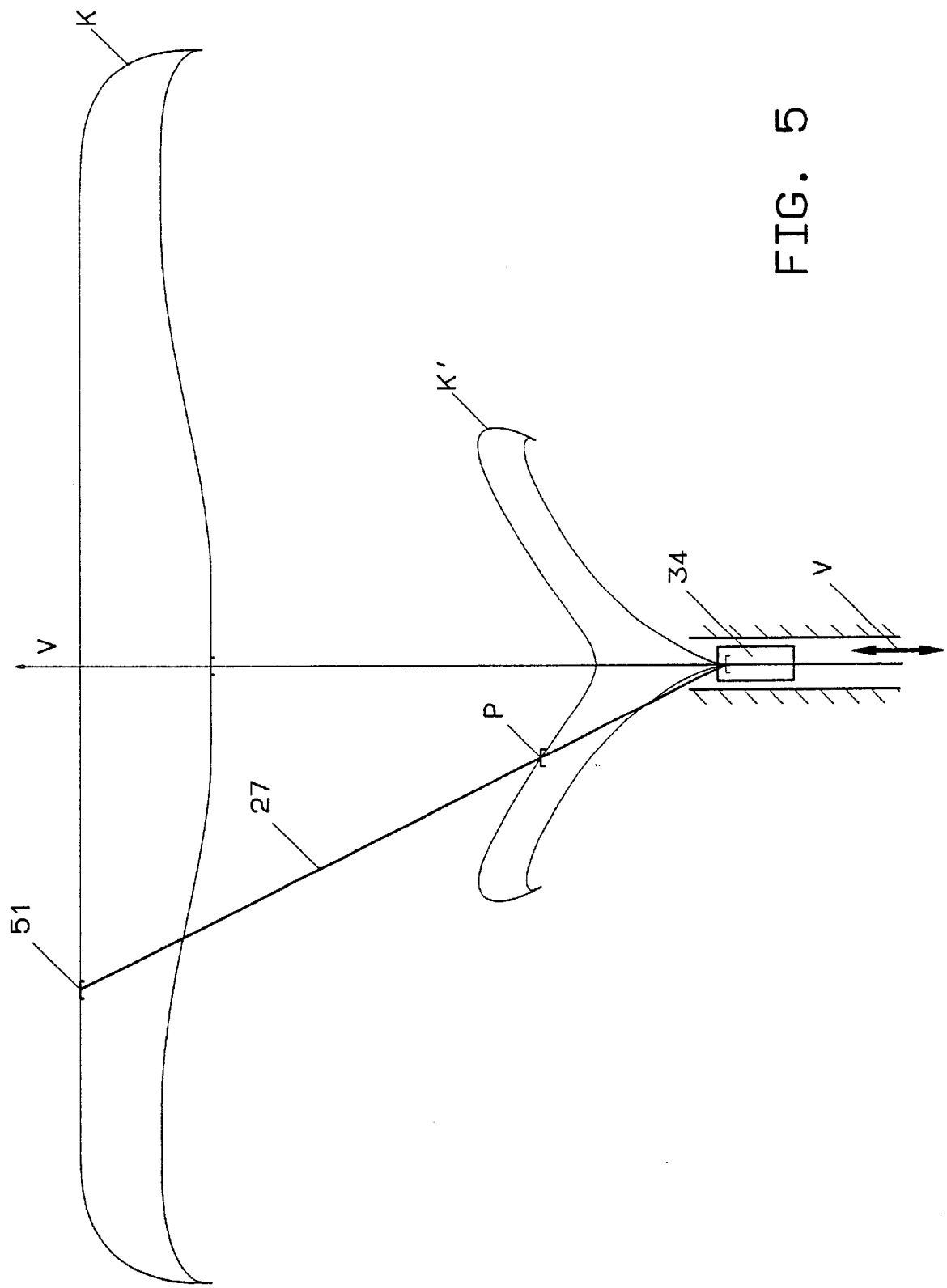

Based on the above, the guide rod 36 may be eliminated if the linear slide block 34 itself, which carries the linear drive is connected with a linear drive device which causes the adjustment of the linear slide block 34 in the vertical direction V. The swivel arm 27 again takes over the step-up, as illustrated by the comparison of the curve K' which is travelled by an arbitrary point P of the swivel arm 27, with the transfer curve K (FIG. 5).

Figure 6:
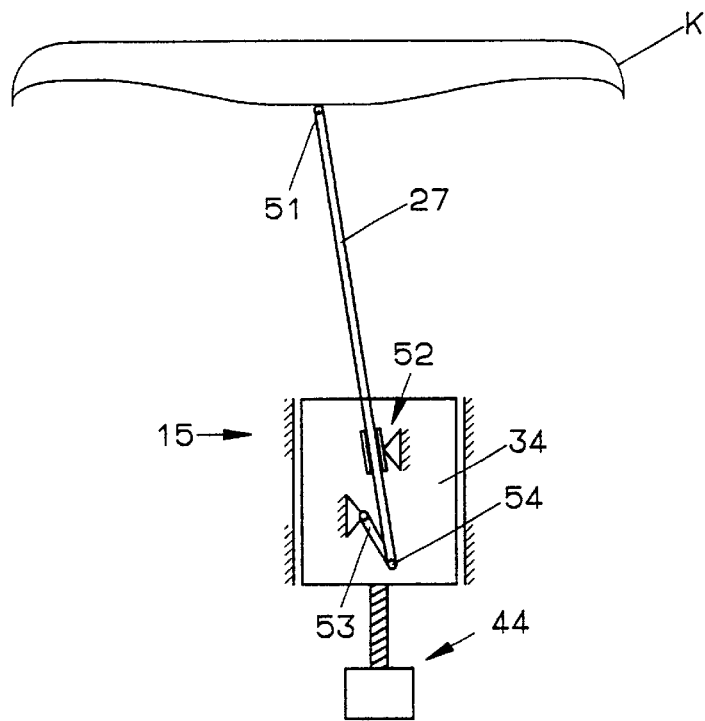
Figure 7:
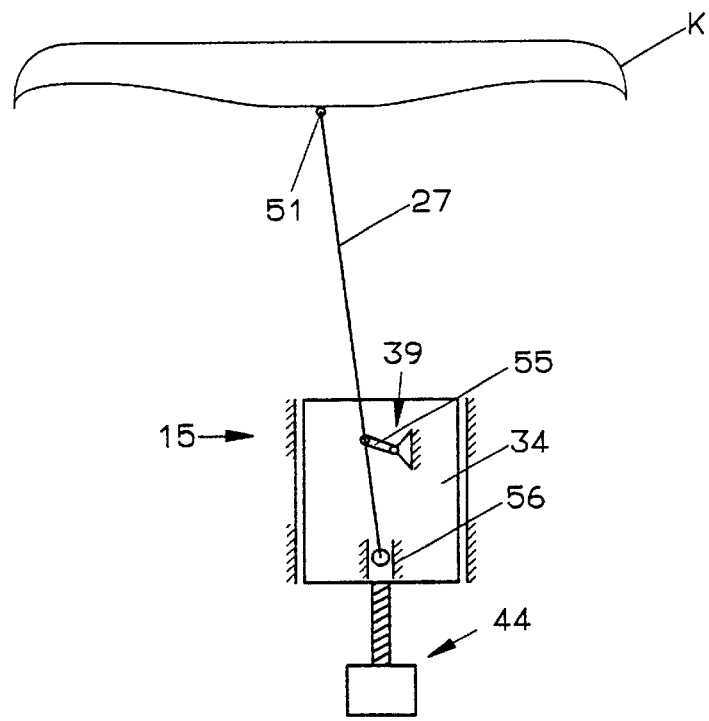

Additional embodiments are illustrated in FIGS. 6 and 7. In the embodiment according to FIG. 6, the linear slide block 34 is connected with the linear drive unit 44. The slide block 34 also carries a swivellably disposed linear guide 52. Its guiding direction is oriented in parallel to the longitudinal direction of the swivel arm 27 and supports the latter. The guiding device itself 52 is disposed about a swivelling axis which is disposed perpendicularly on a plane described by the transfer curve K.

At its end away from the swivelling axis 51, the swivel arm 27 is connected with a drive device. This drive device may have a guide rod 53 which, swivellably at an articulation axis 54, is connected with the end of the swivel arm 27. The other end of the guide rod 53 is connected with a rotary drive unit which is not shown in detail.

FIG. 7 illustrates another modified embodiment of the transfer module 15 with an inoperative linear drive unit 44 and with the slide block 34 with a moved swivel drive unit 39. The lower end of the swivel arm 27 is vertically displaceably disposed in a linear guide 56, while the swivel arm 27 is connected at a point spaced away therefrom with a guide rod 55. This guide rod connects the swivel drive 39 with the swivel arm 27.

A transfer system, particularly for the transfer of workpieces in multi-station presses 1, consists of several transfer modules 14 to 19, which each have a workpiece holding device 28 which is carried by at least one lever mechanism 23. Each lever mechanism transmits the adjusting movement of two mutually independent drives 39, 44 to the workpiece holding device 28. One of the drives 39,44 is disposed in a stationary manner, and the other is moved by the drive disposed in a stationary manner. This basic principle opens up many design possibilities.

What is claimed is:

1. Transfer system for transfer of workpieces, particularly body parts for motor vehicles, between stations of a machining system, particularly between press stages of a multi-station press, comprising transfer modules arranged between stations of a system, each said transfer module having a controllable workpiece holding device which is set up for coupling the workpiece temporarily to a support device, and each said transfer module having at least one mechanism with a swivel arm, which is connected with and guides the workpiece holding device (28) on an at least two-dimensional transfer curve, as well as at least one linear drive unit and one swivel drive unit for swivelling the swivel arm about a swivelling axis, wherein the swivelling axis of the swivel arms driven by the swivel drive unit (39) is oriented to deviate from a vertical direction.

2. Transfer system according to claim 1, wherein the swivel drive unit has an output whose axis of rotation is aligned in parallel to the swivelling axis or coincides therewith.

3. Transfer system according to claim 2, wherein the swivelling axis is arranged horizontally.

4. Transfer system according to claim 1, wherein the swivelling axis is oriented transversely to the transport direction and is configured to be vertically adjustable or movable.

5. Transfer system according to claim 1, wherein the stations are press stages in which the workpieces are formed by a slide which is driven to move back and forth in a machining direction, the swivelling axis being oriented in a direction which deviates direction at a right angle to machining direction.

6. Transfer system according to claim 1, wherein the linear drive unit has an output movable linearly in a direction which is at an angle to the swivelling axis.

7. Transfer system according to claim 6, wherein a direction of the movement of the linear drive unit is the vertical direction.

8. Transfer system according to claim 1, wherein the linear drive unit is disposed in a stationary manner on press stands, and the rotary drive unit is arranged on a support device moved by the linear drive unit.

9. Transfer system according to claim 1, wherein the rotary drive unit is arranged in a stationary manner, and the linear drive unit is arranged on the swivel arm which is telescopable in order to cause a change of the length of the latter.

10. Transfer system according to claim 1, wherein the rotary drive unit and the linear drive unit have one servo motor respectively as a drive source.

11. Transfer system according to claim 1, wherein the swivel arm takes up a vertical position in a center position or a parking position, from which vertical position the swivel arm can swivel out to both adjacent stations by an essentially identical angular amount in and against the transport direction.

12. Transfer system according to claim 1, wherein the transmission is a lever mechanism which includes the swivel arm.

13. Transfer system according to claim 11, wherein the lever mechanism is configured to generate a stepped-up movement curve at its output.

14. Transfer system according to claim 1, wherein the transfer module has two mutually mirror-symmetrical transmissions, in which the workpiece holding device is a suction bridge carried on each of two ends thereof by a swivel arm of one of the transmissions.

15. Transfer system according to claim 1, wherein the at least one weight relieving device is assigned to the transfer module.

16. Transfer system according to claim 1, wherein the transfer curve has two independent movement components, in which paths of different lengths are travelled, the linear drive unit being assigned to a shorter of the paths, and the swivel drive unit being assigned to a longer of the paths.

17. Transfer system according to claim 11, wherein the lever mechanism is arranged in a vertical plane.

18. Transfer system according to claim 11, wherein all articulation and swivelling axes of the lever mechanism are arranged horizontally and transversely to the transport direction.

* * * * *